Figure 1:
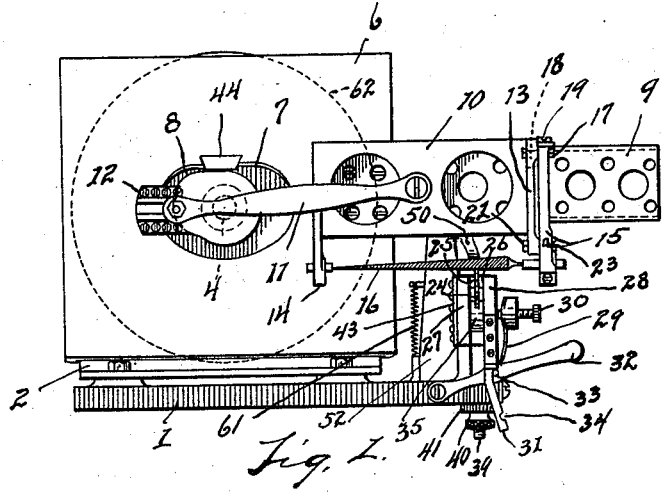

C. F. HERTZ.
SAW FILING MACHINE.
APPLICATION FILED SEPT. 17, 1913.

1,135,015.

Patented Apr. 13, 1915.
3 SHEETS—SHEET 1.

WITNESSES:
Selene McDonald
Richard Aspas

INVENTOR.
CHARLES F. HERTZ.
BY
Charles E. Vieweg
ATTORNEY.

C. F. HERTZ.
SAW FILING MACHINE.
APPLICATION FILED SEPT. 17, 1913.

1,135,015.

Patented Apr. 13, 1915.
3 SHEETS—SHEET 2.

WITNESSES:

INVENTOR.
CHARLES F. HERTZ.
BY
ATTORNEY.

C. F. HERTZ.
SAW FILING MACHINE.
APPLICATION FILED SEPT. 17, 1913.
1,135,015.
Patented Apr. 13, 1915.
3 SHEETS—SHEET 3.
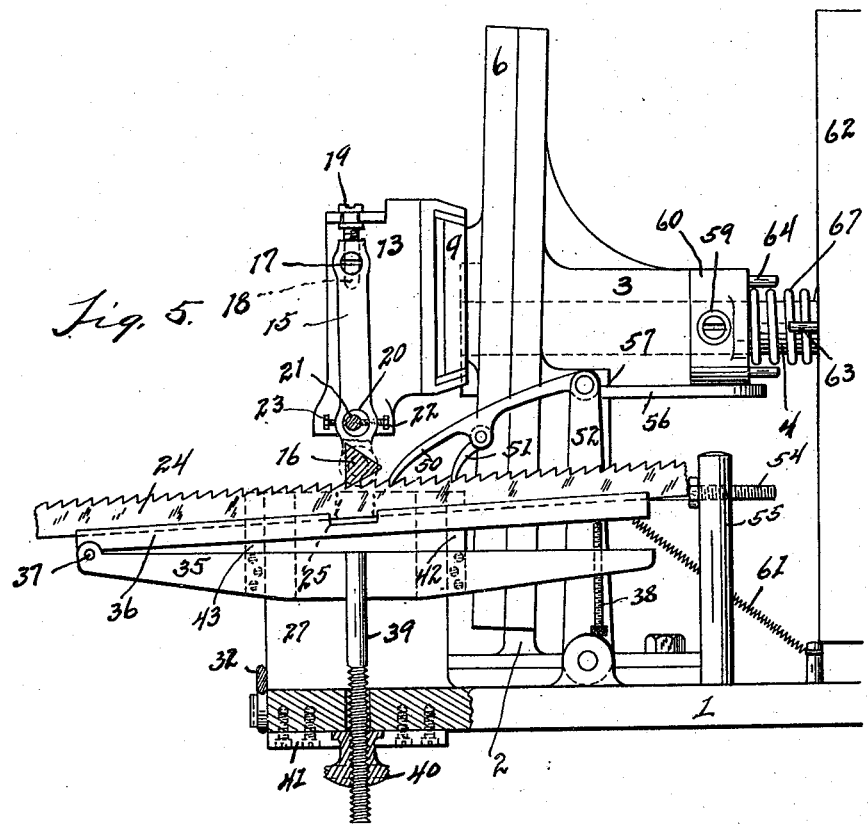
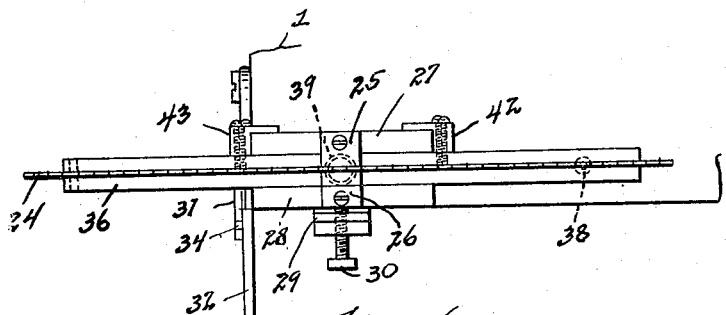
WITNESSES:
INVENTOR.
CHARLES F. HERTZ.
BY
ATTORNEY.

UNITED STATES PATENT OFFICE.

CHARLES F. HERTZ, OF DETROIT, MICHIGAN.

SAW-FILING MACHINE.

1,135,015.      Specification of Letters Patent.      Patented Apr. 13, 1915.

Application filed September 17, 1913. Serial No. 790,165.

*To all whom it may concern:*

Be it known that I, CHARLES F. HERTZ, a citizen of the United States, residing at Detroit, county of Wayne, State of Michigan, have invented a certain new and useful Improvement in Saw-Filing Machines, and declare the following to be a full, clear, and exact description of the same, such as will enable others skilled in the art to which it pertains to make and use the same, reference being had to the accompanying drawings, which form a part of this specification.

This invention relates to saw-filing machines, and its object is to produce an automatically operated device for the proper filing of hand-saws, particularly such saws in which the blade is removable from the frame for insertion in the machine such as butchers' saws or the like.

Another object is a device of the character stated in which the file, after being drawn across the tooth in the sharpening operation, is raised away from and out of contact with the tooth preparatory to its operation upon a succeeding tooth, and thus avoiding the drawing of the file across the point of the tooth and deforming it.

A further object of the invention resides in the means for supporting the saw during the filing operation at an angle to the horizontal whereby the file may be raised and lowered in substantially vertical direction to engage saw teeth that are somewhat undercut, the supporting means being angularly adjustable whereby the undercut side of the tooth may lie in substantially a vertical plane.

These and further objects and novelties of the invention are hereinafter more fully described and claimed and shown in the accompanying drawings in which—

Figure 2:
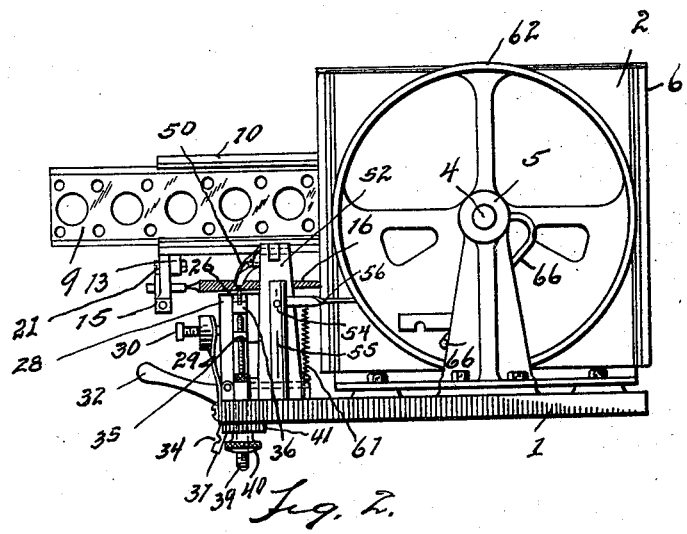
Figure 3:
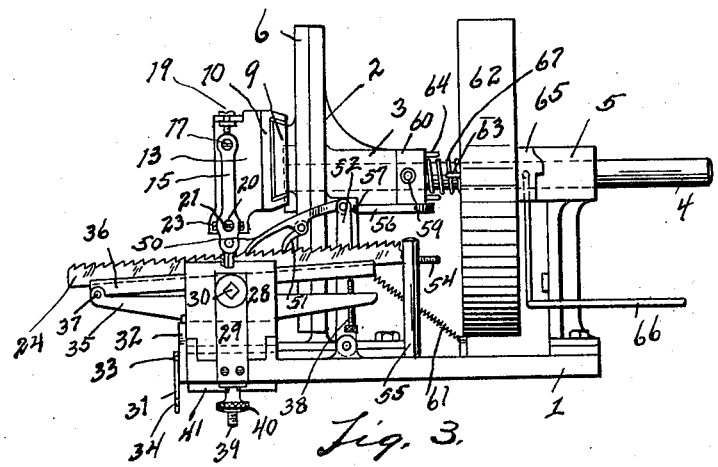
Figure 4:
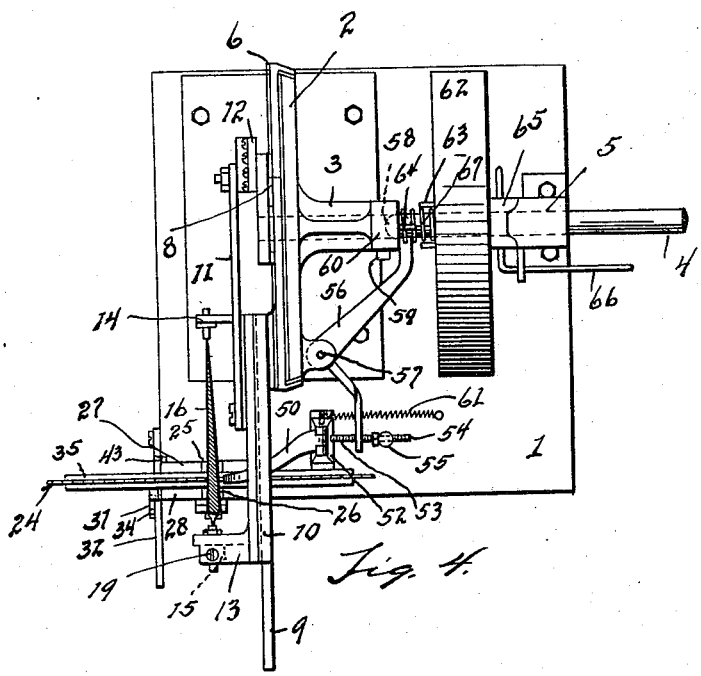

Figure 1 is a side elevation of a saw filing machine embodying my invention. Fig. 2 is a similar elevation on the side opposite to that shown in Fig. 1. Fig. 3 is an end elevation of the machine. Fig. 4 is a plan view thereof. Fig. 5 is an enlarged end view partly in section showing the adjustable blade holder. Fig. 6 is a plan view of the saw blade and holder.

Similar characters refer to similar parts throughout the drawings and specification.

The machine consists of a base member 1 secured to which is a vertically extending guide member 2 provided with a bearing 3 for the drive shaft 4, which also extends through a bearing 5 secured to the base. On the guide member 2 is a vertically reciprocating member 6 apertured at 7, as shown in Fig. 1, in which aperture is located a cam 8 secured to the drive shaft. The aperture 7 is provided with a cam shoe 44 so that a rotation of the cam raises the reciprocable member 6 on the guide member and allows it to fall by gravity. The guide member 2 is at a slight angle to the vertical for the purpose hereinafter described.

Secured to the plate 6 is a horizontally extending guide plate 9 carrying the plate 10, which is horizontally reciprocable thereon by means of the pitman 11, one end of which is attached to the plate 10 and the opposite end of which is adjustably secured to a slotted plate 12 attached to the cam 8. Rotation of the drive shaft and cam thereon, consequently reciprocates the plate 10 on the guide member 9. To the plate 10 and preferably integrally formed therewith are depending arms 13 and 14, and to the arm 13 is secured an adjustable file supporting member 15. The lower end of the member 15 and arm 14 are each provided with means for engaging and holding the ends of the file 16.

The upper end of the member 15 is pivoted on a bolt 17 extending through a slot 18, shown by dotted lines in Fig. 5, in the arm 13 and the upper end of the member 15 is tapped to receive the end of the adjusting screw 19. By loosening the bolt 17 in its slot, rotation of the screw 19 will raise or lower the arm 15 as may be required to place the lower saw engaging edge of the file in a horizontal line so as to engage the tooth evenly throughout the stroke. Near the lower end of the member 15 is an aperture 20 into which extends a lug or bolt 21 in position to be engaged by the oppositely positioned set screws 22 and 23 whereby the member 15 may be swung to one side or the other to bring that face of the file adapted to engage a vertical face of the saw tooth in a perfectly straight line.

The saw blade 24 is frictionally held between the lugs 25 and 26 on the fixed and hinged jaws 27 and 28 respectively, the hinged jaw being forced to position with the lug 26 thereon in engagement with the saw by means of the spring 29 provided with an adjustment screw 30 on the outer end thereof, whereby pressure of the spring may be increased or diminished to engage the saw with more or less pressure. The jaw 28, as may be seen in Figs. 2 and 3, is pivoted on lugs with which the base is provided, and the jaw is also provided with a depending angularly positioned notched arm 31. Pivoted to the base of the device is a lever 32 provided with a pin 33 engaging against the face of the arm and, when the lever is in the position shown in Fig. 1, the spring 29 may act to hold the jaw 28 with the lug thereon in engagement with the saw, and by depressing the lever 32 the pin 33 will ride down the face of the depending arm 31 forcing the jaw open in which position it will remain by reason of the pin engaging in the notch 34 in the depending arm, and thus allowing the saw to be easily withdrawn. As may be more clearly seen in Figs. 1 and 6 the jaws 27 and 28 are spaced apart and in this space is situated a saw supporting member composed of the portions 35 and 36, hinged together at one end at 37. At the opposite end, the member 35 is provided with a set screw 38, the end of which engages the lower side of the saw supporting member 36 which is longitudinally slotted upon the upper surface to receive the saw, and by adjusting the screw 38 the angularity of the member 36 may be altered whereby one face of the saw teeth may be positioned to line in substantially a vertical plane. The member 35 is provided with a threaded stem 39 extending through the base of the machine and through an adjusting nut 40 held in position by the plate 41 secured to the base, whereby rotation of the nut 40 raises or lowers the saw supporting member whereby the saw may be adjusted in its relation to the file to provide the depth of cut required. The member 35 is provided with plates 42 and 43 which engage about the edges of the fixed jaw 27, which therefore, holds the member from displacement while allowing it to be moved up or down on the jaw 27.

Rotation of the drive shaft 4 causes the cam 8 to rotate which reciprocates the plate 6 on the angularly disposed standard 2 by reason of the engagement of the point of the cam with the cam shoe 44 in the aperture 7, raising the plate 6 during the forward stroke of the file frame, and, as the high point of the cam passes the shoe, the plate 6 falls by gravity and positions the file in filing relation with a tooth of the saw and the backward stroke of the file frame draws the file across the tooth. At the finish of the backward stroke the file frame is again raised and the operation repeated until all the teeth have been similarly acted upon.

As before stated, the saw is frictionally held from movement in the guide support 36 by the spring pressed jaw 28 which holds the saw with sufficient tension to prevent accidental movement thereof but, nevertheless, does not prevent its endwise movement on the guide support by the pawl 50. As shown more clearly in Figs. 3 and 5, a second pawl 51 is pivoted to the pawl 50 and the points of both pawls engage different teeth of the saw. The utility in providing the two pawls is, that, in the event of one of the teeth of the saw being broken, one or the other of the pawls will engage a tooth and the saw properly moved forward to bring the succeeding tooth under the file. The pawl 50 is pivoted to a standard 52 hinged to the base 1. As may be seen more clearly in Fig. 4, the standard 52 is provided with a projecting stem 53 in alinement with which is a stem 54 in a standard 55 fixedly secured to the base. The stem 54 is threaded in the standard 55 and provided with a locknut, whereby the standard 52 may be moved forward or back to lengthen or shorten the stroke of the pawls 50 and 51 to accord with the distances between the centers of the saw teeth. Between the ends of the stems 53 and 54 extends an end of the lever 56 pivoted at 57 to the member 2. The opposite end of the lever extends beneath the shaft 4 and is provided with a cam end 58, shown by dotted lines in Fig. 4, which is engaged once during each revolution of the shaft by the roller 59 on the collar 60 secured to the shaft. Contact of the roller with the cam 58 forces the pawls forward and moves the saw in its guide support to bring each succeeding tooth into filing relation with the file. The pawls and standard 52, and lever 56 are repositioned for succeeding operations by a spring 61 attached to the base and to the standard 52.

The shaft 4 is rotated through the medium of the belt wheel 62 which is loose on the shaft, and actuation of the shaft and other mechanism results from moving the wheel 62 to the left from the position shown in Fig. 4 which brings the pins 63 thereon into position to engage the pins 64 on the collar 60 which is secured to the shaft. Movement of the belt wheel 62 longitudinally of the shaft is effected by rotation of the cam collar 65 on the shaft, the cam faces on which engage the corresponding faces on the bearing 5, and by simply rotating the collar 65 by pulling the actuating lever 66 forward the belt wheel is shifted into engagement with the collar 60, and the reverse movement allows the wheel 62 to move out of engagement with the collar 60 by reason of the action of the coil-spring 67 on the shaft 4 which throws the machine out of operation.

From the foregoing description it becomes evident that the device is entirely automatic in action, and, by reason of the position of the upright member 2 at an angle to the vertical, the file is raised from engagement with the saw teeth without distorting the tooth by dragging the file across the point thereof, and that, by reason of the adjustable support, files having teeth formed with various angles may be readily operated upon, and that the whole forms a machine that is simple and economical in operation requiring no care upon the part of the operator after the machine is once set to accommodate a particular blade or series of similar blades.

Having thus described my invention, its utility and mode of operation, what I claim and desire to secure by Letters Patent of the United States is—

1. In a saw filing machine, in combination with file carrying mechanism, means for frictionally engaging the saw blade, vertically adjustable means to regulate the depth of the file-cut, said means being also adjustable at an angle to the horizontal whereby one side of the saw teeth stands substantially vertical, means for reciprocating the file carrying means, means for raising the file from engagement with a saw tooth during the movement of the file in one direction, and allowing it to fall by gravity into engagement with the saw tooth during its movement in the opposite direction, and means operable during the time the file is out of engagement with the saw for bringing consecutive saw teeth into position to be operated upon by the file.

2. In a saw filing machine, the combination of a reciprocable carriage provided with file holding devices, means for adjusting the file to bring the lower cutting edge into a horizontal plane and a side thereof into a substantially vertical plane, means whereby the file is raised from engagement with the saw during movement in one direction, and into engagement with the saw during movement in the opposite direction, the file carrying mechanism being so mounted as to draw away from the side of the saw tooth as the file is raised out of engagement therewith, means for frictionally holding the saw, means for adjusting the saw holder to vary the depth of the file cut, the holder being adjustable angularly relative to a horizontal plane to accommodate saws having teeth of various angles, and means for moving the saw longitudinally in the holder to bring consecutive teeth into filing position.

3. In a saw filing machine, in combination with file operating mechanism, a clamp for frictionally engaging the saw, a holder for supporting the saw comprising a vertically adjustable base member and a channeled guide member hinged thereto and adjustable in angular relation therewith whereby the angle at which the saw teeth are presented to the file may be adjusted, means for setting the file to engage the saw teeth at the proper angle during engagement therewith, means whereby the file draws away from the tooth as it is raised for successive strokes, and means for moving the saw blade to bring consecutive teeth into filing position.

In testimony whereof, I sign this specification in the presence of two witnesses.

CHARLES F. HERTZ.

Witnesses:
PATRICK J. KELAHER,
CHARLES E. WISNER.